United States Patent [19]

Aonuma et al.

[11] 3,717,504

[45] Feb. 20, 1973

[54] MAGNETIC RECORDING MEDIUM

[75] Inventors: Mashashi Aonuma; Masaaki Fujiyama; Goro Akashi, all of Kanagawa, Japan

[73] Assignee: Fuji Photo Film Co., Ltd., Kanagawa, Japan

[22] Filed: Aug. 6, 1970

[21] Appl. No.: 61,561

[30] Foreign Application Priority Data

Aug. 6, 1969 Japan ....................44/61679

[52] U.S. Cl. ....................117/239, 29/195, 29/197, 29/199, 117/236, 117/240

[51] Int. Cl. ....................H01f 10/06

[58] Field of Search ....................117/236–240; 29/195 P, 197, 199

[56] References Cited

UNITED STATES PATENTS

| | | | |
|---|---|---|---|
| 3,370,979 | 2/1968 | Schmeckenbecher | 117/239 |
| 3,516,860 | 6/1970 | Simmons | 117/239 X |
| 3,417,389 | 12/1968 | Dike | 117/239 UX |
| 3,328,195 | 6/1967 | May | 117/239 |
| 3,150,939 | 9/1964 | Wenner | 29/195 |
| 3,006,819 | 10/1961 | Wilson et al | 29/195 |
| 3,531,322 | 9/1970 | Kefalas et al. | 117/239 X |
| 3,525,638 | 8/1970 | Archey | 117/240 |

*Primary Examiner*—William D. Martin
*Assistant Examiner*—Bernard D. Pianalto
*Attorney*—Sughrue, Rothwell, Mion, Zinn and Macpeak

[57] ABSTRACT

A magnetic recording medium prepared by applying a magnetizable layer onto one surface of a non-magnetizable substrate by either electrolytic or non-electrode plating, applying a nickel layer onto the exposed surface of said magnetizable layer having a thickness less than 0.2$\mu$ and applying a rhodium layer onto the exposed surface of said nickel layer having a thickness greater than 0.2$\mu$, the magnetic recording medium having a smooth surface and excellent magnetic properties such as improved rectangular ratio, as well as exhibiting extended service life, the magnetizable layer being protected by said nickel and rhodium layers.

10 Claims, 6 Drawing Figures

PATENTED FEB 20 1973 3,717,504

SHEET 1 OF 3

INVENTORS
MASASHI AONUMA
MASAAKI FUJIYAMA
GORO AKASHI

MAGNETIC RECORDING MEDIUM

BACKGROUND OF THE INVENTION

1. Field of the Invention

This invention relates to magnetic recording mediums for use in various magnetic recording devices and more particularly, to a magnetic recording medium comprising a substrate having a magnetic recording layer plated on one surface thereof and protective layers covering the exposed surface of the magnetic recording layer.

2. Description of the Prior Art

Magnetic recording layers comprising magnetic iron oxide such as $\gamma$ - $Fe_2O_3$ or $Fe_3O_4$, or binding agents having a magnetic alloy metal powder dispersed therein, have been generally employed. In addition, for some applications magnetizable metal-plated magnetic recording layers have been employed. In electronic data processing systems (EDPS), various magnetic recording media such as magnetic discs, drums, tapes and cards are generally employed and such magnetic recording media are required to resist impact and/or abrasion.

A magnetic recording disc must possess a recording surface free of defects such as scratches, unevenness and/or run-cuts and is also required to possess mirror-like flatness as well as sufficient hardness. If the magnetic recording disc lacks the required flatness, the floating characteristic of the magnetic head, which is employed in conjunction with the disc in the recording device, will rapidly deteriorate. When the magnetic head is a contact-type magnetic head, especially, the deterioration of the floating characteristics of the magnetic head may lead to possible damage of the head and/or disc. Further, when a floating-type magnetic head is employed, it may contact the magnetic recording head when the head begins to float and/or due to dust and the like which may be interposed between the head and disc. Since information recorded on the magnetic recording disc may be destroyed by such contact between the head and disc, it is necessary to avoid such contact. Thus, it is very important that a magnetic recording disc possess sufficient impact- and abrasion-resistance.

As processes for preparing magnetic recording layers by depositing magnetic metal onto a substrate, electroplating, chemical plating, cathode sputtering, vacuum depositing and vapor-phase plating are known and conventionally practiced. However, the magnetic recording layer formed by any of these prior art plating processes tends to peel off the substrate and/or become scratched when it is subjected to severe impact and/or abrasion, leading to the destruction of the information recorded on the layer and, as a result, the service life of the layer is shortened.

Further, when a magnetic recording layer comprising a plated magnetic metal is directly exposed to the atmosphere, it loses its required weather-resistance and is subject to corrosion.

In order to overcome the above difficulties, strenuous efforts have been exerted. Preparation of magnetic recording layers having improved weather-resistance by applying protective layers onto magnetic recording layers and bonding lubricants to magnetic recording layers, for example, have been proposed.

SUMMARY OF THE INVENTION

According to the present invention, a magnetic recording medium may be prepared by electroplating, chemical plating, cathode sputtering, vacuum depositing and vapor-phase plating magnetic recording layer of magnetic metal onto one surface of a prepared substrate, applying a first protective layer of a thin glossy film onto the exposed surface of the magnetic recording layer and finally applying a second protective layer of a very thin rhodium film onto the exposed surface of the first protective layer.

DETAILED DESCRIPTION OF THE INVENTION

Since it is generally undesirable to employ a protective layer of great thickness, from the viewpoint of the magnetic recording characteristics obtained, it is necessary to form the protective layer as thinly as possible.

If the protective layer has an undesirably great thickness, there will be present a wide space between the read or write-transducer and the magnetic recording surface on which the protective layer is applied, resulting in spacing loss and, in such cases, the relationship between the space and the spacing loss may be expressed by the following formula:

$$\text{Spacing loss} = 54.6\ (d/\lambda)\ (dB)$$

wherein $d$ is the space between the magnetic recording surface and magnetic head and $\lambda$ is the recording wave length. As seen from the above formula, the greater the space between the magnetic recording surface and magnetic head, or the shorter the magnetic recording wave length, the greater is the resulting spacing loss. In other words, the higher the recording density, the greater the effects of the space between the magnetic recording surface and magnetic head and, as a result, the output level is reduced, leading to the effect known as "drop-out."

In the magnetic recording medium of the present invention, the nickel film which serves as the first protective layer has a thickness of less than 0.2 $\mu$ and the rhodium film which serves as the second protective layer has a thickness of greater than 0.02 $\mu$ . The surface of the thus prepared magnetic recording medium has excellent gloss and flatness.

Another important advantage obtainable by the provision of the first and second protective layers is to impart excellent magnetic characteristics and, especially, an improved rectangular ratio to the plated magnetic recording layer. Furthermore, by the provision of the protective layers of the present invention, the magnetic recording layer will not be subjected to direct impact and/or abrasion from the magnetic head, thereby substantially extending the service life of the magnetic recording layer. In addition, the presence of the rhodium film as the second protective layer assists in improving the service life, mechanical strength and, especially, the abrasion-resistance of the magnetic recording layer.

More particularly, the application of the nickel film as the first protective layer on the magnetic recording layer will increase the gloss of the surface of the recording layer as well as increase its flatness and advantageously affect the magnetic characteristics of the magnetic recording layer. Such improvements are especially conspicuous when the nickel layer has a thickness less than 0.2$\mu$. The application of the rhodium film as the second protective layer onto the nickel film will impart a further improved gloss and a mirror-like flatness to the magnetic recording layer as well as result in improvement in the magnetic characteristics of the recording layer. The magnetic recording layer will possess excellent weather-resistance, corrosion-resistance, heat-resistance and hardness.

Furthermore, the use of the nickel film as the first protective layer will serve to reduce the amount of rhodium necessary for forming the second protective layer, which would otherwise be greater. Since rhodium is an expensive material, the reduction of the amount necessary for the second protective layer is advisable from the viewpoint of economy. For attaining the advantages of the present invention more effectively, the magnetic recording layer in the magnetic recording medium of the present invention preferably comprises a plated layer formed from an electroplating bath composition containing cobalt or cobalt-nickel as the principal component. The magnetic recording layer most preferably comprises a plated layer formed from a cobalt-nickel base plating bath composition having copper contained therein as an impurity.

The nickel and rhodium layers by which the magnetic recording medium of the present invention is characterized may be formed by the processes as mentioned hereinbelow, respectively. In brief, the nickel layer may be formed by applying an aqueous solution comprising a suitable compound such as a nickel base compound or nickel-cobalt base compound by electroplating or electroless plating onto the exposed surface of a previously formed magnetic recording layer on the substrate. The details of the nickel plating will be discussed hereinafter in connection with specific examples of the present invention. The rhodium layer is formed by applying a suitable aqueous solution such as rhodium salt, rhodium phosphate, phosphoric acid-rhodium phosphate, rhodium sulphate, rhodium sulphamate or rhodium borate by electroplating onto the exposed surface of the nickel layer. Thus, the nickel layer may comprise a nickel-, nickel-phosphorous- or nickel-cobalt-base composition and the rhodium layer may comprise a nickel- or nickel alloy-base composition.

The magnetic recording medium of the present invention may be in the form of a magnetic tape, disc, drum, wire, card or the like. Accordingly, as the material for the substrate of the magnetic recording medium, aluminum, aluminum alloy, copper alloy, glass, magnesium alloy, or higher molecular weight material such as polyethylene terephthalate or polypropylene or the like may be used.

As the material for the magnetic recording layer, various compositions comprising Co-Ni alloy and Co as the principal components and Cu, Ag, P, Zn, Rh, La, Ce, Nd, Sn or the like as the additive may be employed. A most preferable composition is Co-Ni-Cu alloy.

Such compositions and processes for the preparation of these substrate and magnetic recording layers are conventional and have long been known in the art.

It is necessary that the magnetic recording layer have a thickness greater than 0.05$\mu$ and the thickness is preferably within the range of 0.1–1.0$\mu$.

The above and other objects and attendant advantages of the present invention will be more readily apparent to those skilled in the art from a reading of the following description of specific examples of the invention, which are given for illustration purposes only and should not be construed as limiting the scope of the invention set forth in the appended claims, in conjunction with the accompanying drawings which show various properties of preferred embodiments of magnetic recording media of the invention and control magnetic recording mediums.

Figure 1:
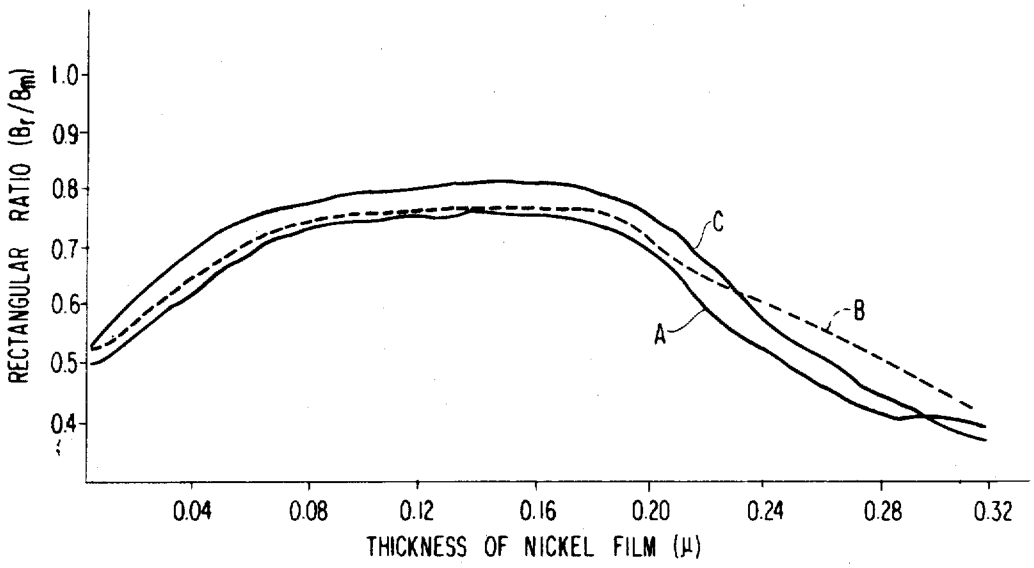
FIGS. 1 to 4 are graphs showing varying magnetic characteristics of various magnetic recording mediums of the invention having first protective layers comprising nickel films of different thicknesses and second protective layers comprising rhodium films of the same thickness, respectively.

The invention will be further exemplified by the following specific examples thereof which illustrate the invention.

Example 1

An aluminum plate, upon which has been previously applied a copper layer by plating, was employed as the substrate for a magnetic recording layer. On one surface of this substrate was applied a magnetic recording layer by depositing with the use of the following plating bath composition and plating conditions.

| | |
|---|---|
| Composition of the Plating Bath | |
| $NiSO_4 \cdot 7H_2O$ | 60 g |
| $NiCl_2 \cdot 6H_2O$ | 10 g |
| $CoSO_4 \cdot 7H_2O$ | 60 g |
| $CoCl_2 \cdot 6H_2O$ | 10 g |
| $H_3BO_3$ | 15 g |
| Formaldehyde | 2 g |
| Water to make | 1 liter |
| Plating Conditions | |
| Current density | 5 A/dm² |
| Temperature | 40°C |
| pH | 5.0 |
| Time Period of Plating | 2.30 minutes |

To the thus formed magnetic recording layer there was applied, on its exposed surface, a glossy nickel layer using the following plating bath composition and plating conditions.

| | |
|---|---|
| Plating Bath Composition | |
| $NiSO_4 \cdot 7H_2O$ | 300 g |
| $NiCl_2 \cdot 6H_2O$ | 60 g |
| $H_3BO_3$ | 40 g |
| Water to make | 1 liter |
| Plating Conditions | |
| Current density | 5 A/dm² |
| Temperature | 60°C |
| pH | 4.5 |
| Agitation by Air | |

The plating times are varied to obtain the desired layer thicknesses as shown in the drawings. The rate of deposition was 0.1 micron/15 sec.

To the thus formed nickel layer there was then applied, onto its exposed surface, a rhodium layer by plating using the following plating bath composition and plating conditions.

| | |
|---|---|
| **Plating Bath Composition** | |
| Rhodium plating solution No. 217 prepared in accordance with the prescription of Nippon Engelhard, Ltd. | |
| **Plating Conditions** | |
| Current density | 1.2 A/dm$^2$ |
| Temperature | 40°C |
| pH | below 1 |

The plating times are varied as for the nickel layer, the rate of deposition being 0.4 micron/5 min.

Figure 2:
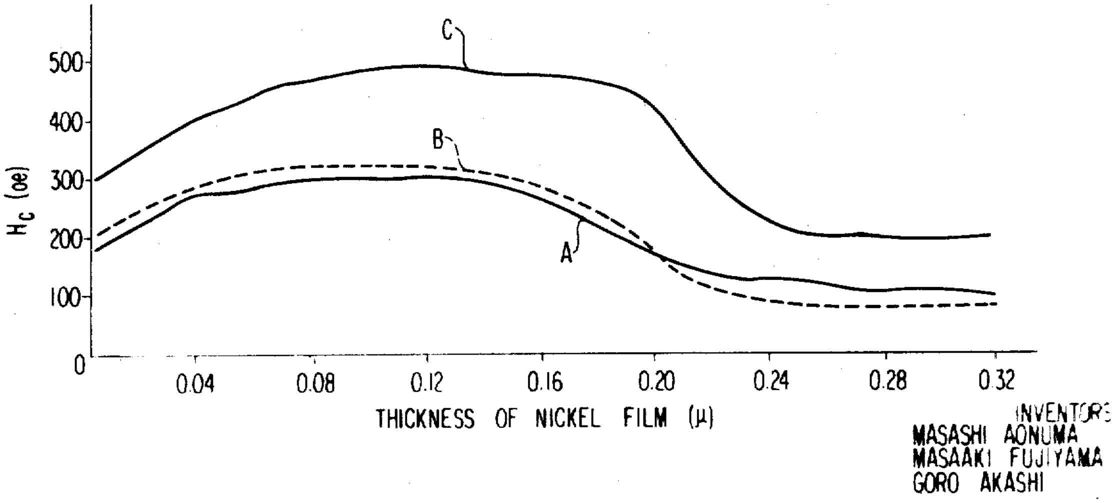
Figure 5:
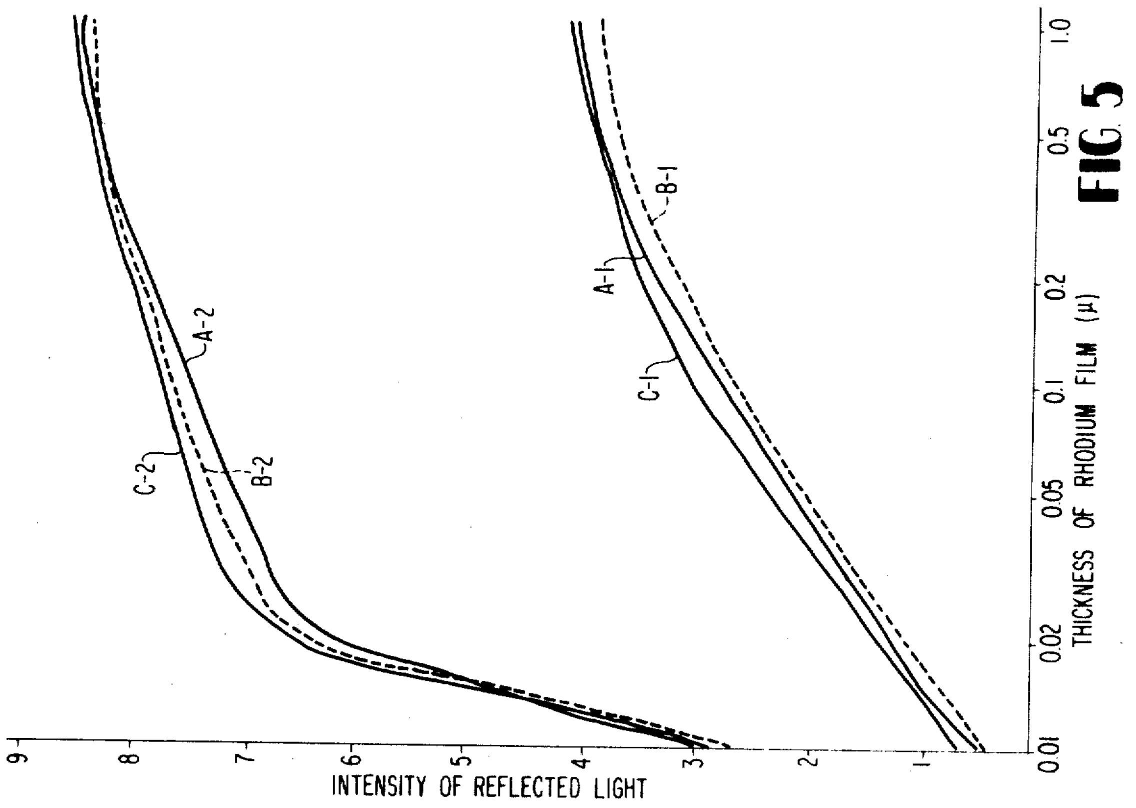

The magnetic recording medium prepared by the above-mentioned procedure is shown in FIGS. 1, 2 and 5 by "A".

Example 2

The procedure employed in this example was identical with that described in connection with Example 1 except for the plating bath composition for the magnetic recording layer which was different from that employed in forming the corresponding layer in Example 1, in that it further contained 5 g. of $AgNO_3$.

The magnetic recording medium prepared by the procedure of Example 2 is shown in FIGS. 1, 2 and 5 by "B".

Example 3

The procedure employed in this example was identical with that described in connection with Example 1 except for the plating bath composition for the magnetic recording layer. The plating bath composition for the magnetic recording layer employed in this example was the bath of Example 1 which further contained 5 g. of $CuSO_4 \cdot 5H_2O$.

The magnetic recording medium prepared by the procedure of Example 3 is shown in FIGS. 1, 2 and 5 by "C".

Example 4

The procedure employed in this example was identical with that described in connection with Example 1 except for the plating bath composition for the magnetic recording layer. The plating bath composition for the magnetic recording layer employed in this Example was as follows.

| | |
|---|---|
| **Plating Bath Composition** | |
| $CoSO_4 \cdot 7H_2O$ | 120 g |
| $CoCl_2 \cdot 6H_2O$ | 20 g |
| $H_3BO_3$ | 15 g |
| Formaldehyde | 2 g |
| Water to make | 1 liter |

Figure 3:
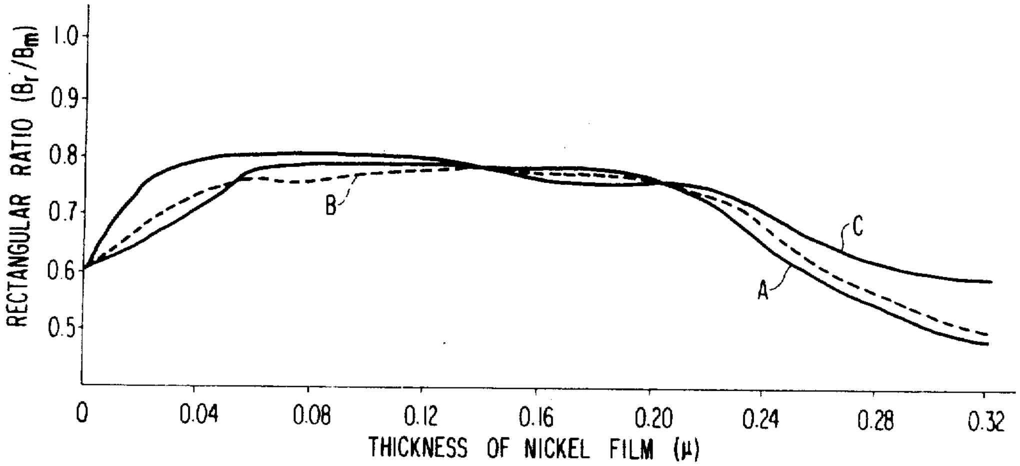
Figure 4:
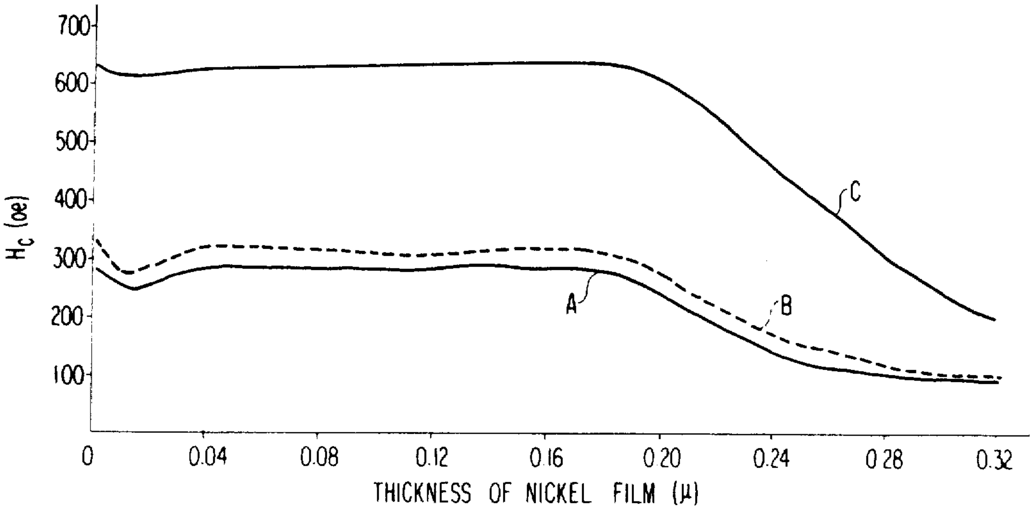
Figure 6:
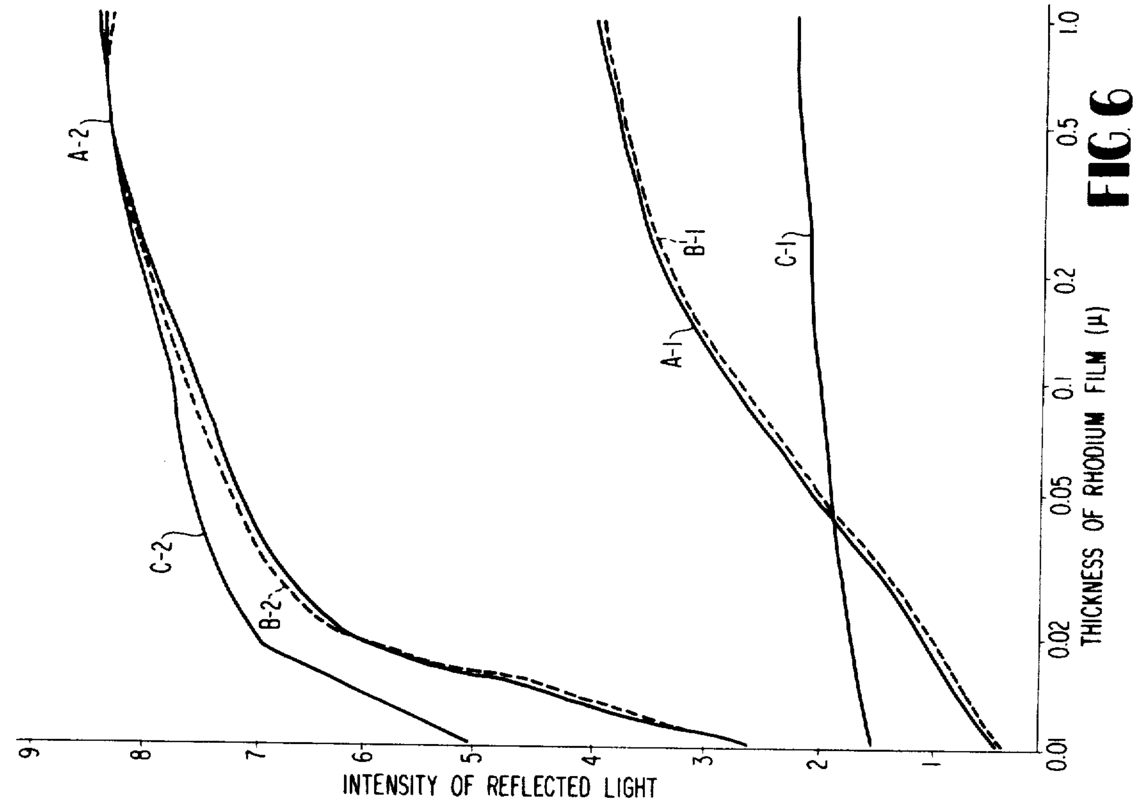
FIGS. 5 and 6 are graphs showing the effects upon the intensity of reflected light on magnetic recording media when the media have first protective layers of nickel films and when they do not have such a protective layer.

The magnetic recording medium prepared by the procedure of Example 4 is shown in FIGS. 3, 4 and 6 by "A".

Example 5

The procedure employed in this example was identical with that described in connection with Example 1 except for the plating bath composition for the magnetic recording layer which further contained 5 g. of $Hg(NO_3)_2 \cdot 2H_2O$ in the bath composition for the corresponding layer employed in Example 3.

The magnetic recording medium prepared by the procedure of Example 5 is shown in FIGS. 3, 4 and 6 by "B".

Example 6

The procedure employed in this example was identical with that described in connection with Example 1 except for the step of plating the magnetic recording layer. The magnetic recording layer of this Example was formed by chemical plating using the following plating bath composition and plating conditions.

| | |
|---|---|
| **Plating Bath Composition** | |
| $CoSO_4 \cdot 7H_2O$ | 14 g |
| $NaH_2H_2O$ | 20 g |
| $Na_2C_4H_4O_6 \cdot H_2O$ | 100 g |
| Water to make | 1 liter |
| **Plating Conditions** | |
| Temperature | 80°C |
| pH | 8.5 (adjusted with NaoH) |
| Time Period of Plating | 10 min. |

The aluminum substrate employed in this example had no copper plate applied thereon, but was only cleaned.

The magnetic recording medium prepared by the procedure of Example 6 is shown in FIGS. 3, 4 and 6 by "C".

Referring now to the various figures of the accompanying drawings, FIGS. 1 to 4 are graphs showing differences in the magnetic characteristics of magnetic recording mediums prepared according to the present invention which have first protective layers comprising nickel films of different thicknesses and second protective layers comprising rhodium films of the same thickness (0.1$\mu$), respectively. FIGS. 5 and 6 are graphs showing the results of reflected light tests conducted on the magnetic recording mediums of the invention in which the reference numeral "1" after "A", "B" and "C", respectively, represents the results of intensity of reflected light tests conducted on control magnetic recording mediums which had no first protective layer (nickel film), but in which the second protective layers (rhodium films), were applied directly on the exposed surface of the magnetic recording layers. The reference numeral "2" after "A", "B" and "C", respectively, represents the results of intensity of reflected light tests conducted on the novel magnetic recording media which had first protective layers (nickel films) of the same thickness (0.2$\mu$) and second protective layers (rhodium films) of different thicknesses.

Element light absorption analysis tests showed that the principal components of the magnetic recording layers in the recording media of Examples 1, 2 and 3 are nickel - cobalt alloys, while the principal component of the corresponding layers in the recording media of Examples 4, 5 and 6 was cobalt.

From the graphs of FIGS. 1 to 4, it will be appreciated that the magnetic recording media of the present invention have excellent magnetic characteristics and, particularly, improved rectangular ratios. The improved rectangular ratios of the novel magnetic recording media can be obtained when the thickness of the nickel film is maintained less than 0.2$\mu$ . Particularly, the magnetic recording medium which has a plated magnetic recording layer from a plating bath composition comprising nickel - cobalt alloy as the principal component and copper added to the bath (Example 3) has quite excellent magnetic characteristics. If the thickness of the nickel film exceeds 0.2μ, the magnetism of the nickel in the nickel film protective layer would adversely affect the magnetic characteristics of the underlying magnetic recording layer. And, from the graphs of FIGS. 5 and 6, it will be appreciated that the novel magnetic recording media have a mirror-like flatness with excellent gloss. The presence of the nickel film between the magnetic recording layer and rhodium film improves the intensity of reflected light on the recording medium and the improvement in the intensity of reflected light is further conspicuous when the thickness of the rhodium film is greater than 0.02μ.

Furthermore, it has been positively confirmed that the presence of the rhodium film imparts excellent weather-resistance, abrasion-resistance, heat-resistance, corrosion-resistance and sufficient hardness to the recording media. As shown in the foregoing specific examples of the invention, according to the present invention, improved magnetic characteristics of the magnetic recording media can be equally attained by means of either electroplating or chemical plating.

The upper limit for the nickel film thickness is 0.2μ, but the lower limit for such thickness can not be defined by any numerical value. Accordingly, for the purpose of the disclosure of the invention, it may be sufficient to state merely that the upper limit for the nickel film thickness is 0.2μ. The lower limit for the rhodium film thickness is 0.02μ and the upper limit for such thickness may be extended to several microns. However, any increase in the thickness of the rhodium film in excess of the prescribed upper limit will not sufficiently produce the desired effect. Similarly, any decrease in the rhodium film thickness below the prescribed lower limit will cause a loss in the effect which will be otherwise obtained. From the above facts, it can be said that according to the present invention, it is most preferable to produce a magnetic recording medium by plating a magnetic recording layer onto one surface of a substrate having been previously plated using a plating bath composition comprising nickel - cobalt alloy as the principal components and having copper added to the bath, applying a first protective layer comprising a nickel film of 0.1μ in thickness onto the exposed surface of the magnetic recording layer and then applying a second protective layer comprising a rhodium film of a thickness range of 0.1 – 0.5μ onto the exposed surface of the first protective layer. The thus obtained magnetic recording medium will have excellent magnetic characteristics, mirror-like flatness and other desired properties with lowered spacing loss caused by protective layers.

The magnetic recording media of the present invention find applications in the fields of magnetic tapes, discs, drums, cards, wire and the like.

While certain preferred embodiments of the invention have been described it will be appreciated that these are shown by way of example only, and the invention is not to be limited thereto as other variations will be apparent to those skilled in the art and the invention is to be given its fullest possible interpretation within the terms of the following claims.

What is claimed is:

1. A magnetic recording medium comprising a non-magnetizable substrate, a magnetic recording layer having a thickness greater than 0.05 micron plated onto one surface of said substrate, a first protective layer consisting essentially of a nickel film plated on the exposed surface of said magnetic recording layer and having a thickness less than 0.2 micron and a second protective layer consisting essentially of a rhodium film plated on the exposed surface of said first protective layer and having a thickness greater than 0.02 micron.

2. A magnetic recording medium as set forth in claim 1, in which said nickel film is formed of a member selected from the group comprising nickel, phosphorus-modified nickel and nickel - cobalt alloy.

3. A magnetic recording medium as set forth in claim 1, in which said rhodium film is formed of pure rhodium or of an alloy containing rhodium as a main component.

4. A magnetic recording medium as set forth in claim 1, in which said nickel film has a thickness range of 0.1 – 0.2μ.

5. A magnetic recording medium as set forth in claim 1, in which said rhodium film has a thickness range of 0.02 – 0.5μ.

6. The magnetic recording medium according to claim 1 wherein the magnetizable material in said magnetic recording layer comprises a cobalt-nickel alloy and at least one member selected from the group consisting of copper, silver, phosphorus, zinc, rhodium, lanthanum, cerium, neodymium, and tin.

7. The magnetic recording layer according to claim 6 wherein said group member is copper.

8. The magnetic recording medium according to claim 1 wherein said substrate is aluminum, aluminum alloy, copper alloy, glass, magnesium alloy, polyethylene terephthalate or polypropylene.

9. The magnetic recording medium according to claim 1 wherein said magnetic recording layer has a thickness in the range of 0.1 – 1.0 microns.

10. The magnetic recording medium according to claim 1 wherein said recording medium is in the form of a magnetic tape, disc, drum, wire or card.

* * * * *